US012576424B2

(12) United States Patent
Sung et al.

(10) Patent No.: US 12,576,424 B2
(45) Date of Patent: Mar. 17, 2026

(54) COATING APPARATUS AND COATING METHOD CAPABLE OF EASILY ADJUSTING THICKNESS OF COATING LAYER

(71) Applicant: LG ENERGY SOLUTION, LTD., Seoul (KR)

(72) Inventors: In Hyouk Sung, Daejeon (KR); Kyung Ryun Ka, Daejeon (KR); Ji Su Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 168 days.

(21) Appl. No.: 17/924,535

(22) PCT Filed: Dec. 14, 2021

(86) PCT No.: PCT/KR2021/018947
§ 371 (c)(1),
(2) Date: Nov. 10, 2022

(87) PCT Pub. No.: WO2023/277285
PCT Pub. Date: Jan. 5, 2023

(65) Prior Publication Data

US 2024/0216946 A1 Jul. 4, 2024

(30) Foreign Application Priority Data

Jun. 30, 2021 (KR) ........................ 10-2021-0085734

(51) Int. Cl.
*B05C 3/12* (2006.01)
*B05C 9/14* (2006.01)
(Continued)

(52) U.S. Cl.
CPC ................ *B05D 1/20* (2013.01); *B05C 3/125* (2013.01); *B05C 9/14* (2013.01); *B05D 3/0254* (2013.01); *B05D 7/586* (2013.01)

(58) Field of Classification Search
None
See application file for complete search history.

(56) References Cited

U.S. PATENT DOCUMENTS

| | | | | |
|---|---|---|---|---|
| 1,930,601 A | | 10/1933 | Townsend | |
| 2,078,214 A | * | 4/1937 | Esselen | B05D 1/20<br>427/280 |

(Continued)

FOREIGN PATENT DOCUMENTS

| | | |
|---|---|---|
| CN | 205376614 U | 7/2016 |
| CN | 208127341 U | 11/2018 |

(Continued)

OTHER PUBLICATIONS

English translation of KR101641285.*

(Continued)

*Primary Examiner* — Charles Capozzi
(74) *Attorney, Agent, or Firm* — Birch, Stewart, Kolasch & Birch, LLP

(57) ABSTRACT

A coating apparatus for continuously forming a coating layer on each surface of a substrate film includes a water tank located on a movement path of the substrate film, a water tank partition vertically located in the water tank, the water tank partition being configured to partition an inner space of the water tank into two zones, including a first water tank portion and a second water tank portion, a roller unit configured to continuously transfer the substrate film, and a heating unit located outside the water tank. The water tank partition is located spaced apart from an inner bottom surface of the water tank by a predetermined distance.

11 Claims, 2 Drawing Sheets

(51) Int. Cl.

| | |
|---|---|
| ***B05D 1/20*** | (2006.01) |
| ***B05D 3/02*** | (2006.01) |
| ***B05D 7/00*** | (2006.01) |

(56) References Cited

U.S. PATENT DOCUMENTS

| | | | |
|---|---|---|---|
| 4,224,896 | A | 9/1980 | Barraud et al. |
| 5,558,715 | A | 9/1996 | Abed et al. |
| 2022/0037634 | A1 | 2/2022 | Aita et al. |

FOREIGN PATENT DOCUMENTS

| | | | | |
|---|---|---|---|---|
| JP | 2004-87042 | A | | 3/2004 |
| JP | 6684484 | B1 | | 4/2020 |
| JP | 2020147832 | A | * | 9/2020 |
| KR | 10-2006-0044570 | A | | 5/2006 |
| KR | 10-1641285 | B1 | | 7/2016 |
| KR | 10-1653347 | B1 | | 9/2016 |
| KR | 10-1750408 | B1 | | 6/2017 |
| KR | 10-2000696 | B1 | | 7/2019 |
| WO | WO 2020/059225 | A1 | | 3/2020 |

OTHER PUBLICATIONS

English translation of JP2020147832A.*
English translation of KR101653347B1.*
Extended European Search Report for European Application No. 21940004.1, dated Jan. 3, 2024.

* cited by examiner

【FIG. 1】
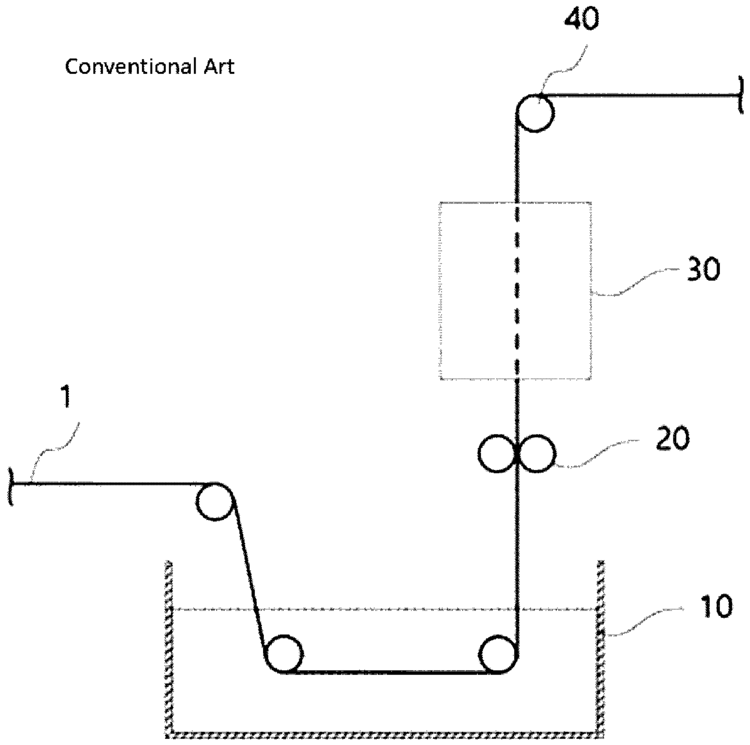
【FIG. 2】
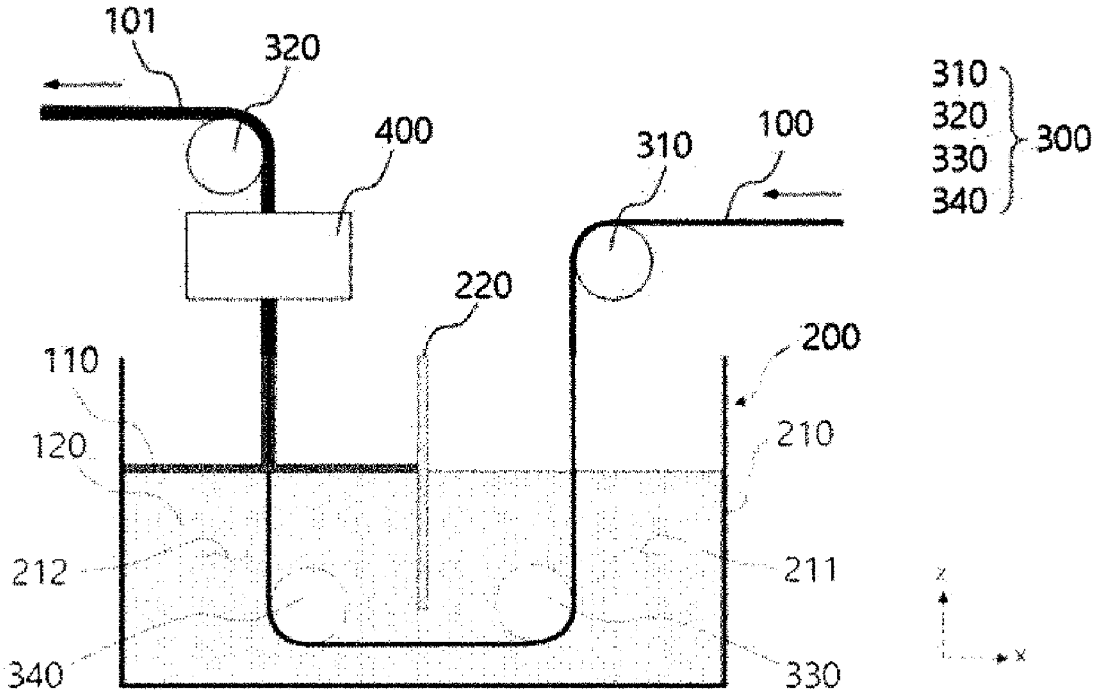

【FIG. 3】
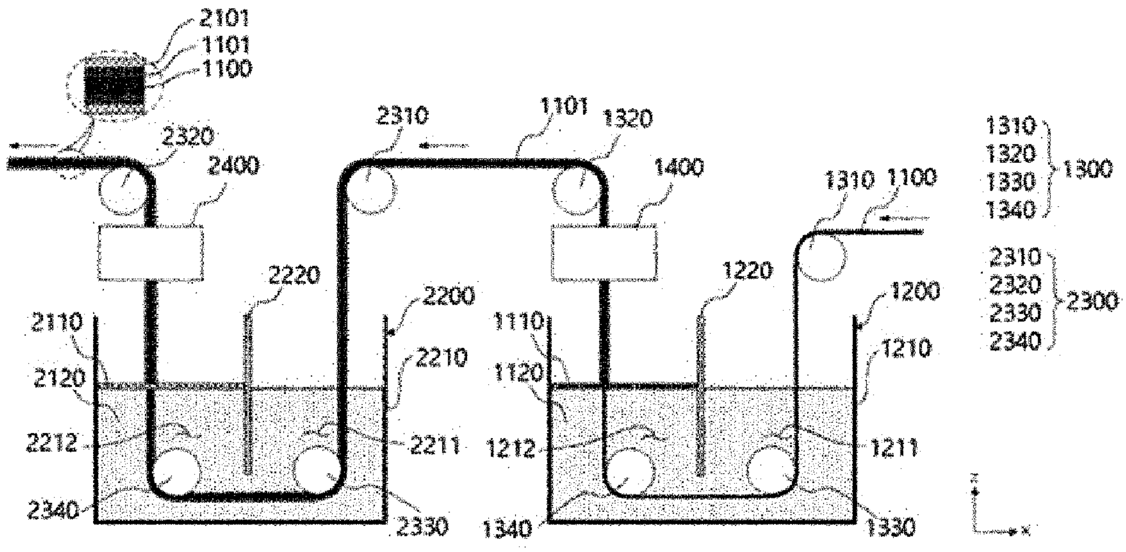

COATING APPARATUS AND COATING METHOD CAPABLE OF EASILY ADJUSTING THICKNESS OF COATING LAYER

TECHNICAL FIELD

This application claims the benefit of priority to Korean Patent Application No. 2021-0085734 filed on Jun. 30, 2021, the disclosure of which is incorporated herein by reference in its entirety.

The present invention relates to a coating apparatus and a coating method of a separator or a current collector for secondary batteries, and more particularly to a coating apparatus and a coating method of a separator or a current collector for secondary batteries capable of adjusting the thickness of a coating layer by adjusting the height of a coating solution layer, whereby it is possible to implement an ultrathin coating thickness.

BACKGROUND ART

With increasing demand for portable electronic devices, such as a smartphone, a tablet, and a laptop computer, demand for secondary batteries as energy sources thereof has also abruptly increased. Thereamong, a lithium secondary battery, which has high energy density and a long battery lifespan, has been most widely used.

The lithium secondary battery is assembled by manufacturing an electrode assembly configured such that positive electrodes and negative electrodes are alternately stacked in the state in which separators are interposed respectively between the positive electrodes and the negative electrodes, inserting the electrode assembly into a battery case constituted by a can or a pouch having a predetermined size and shape, and injecting an electrolytic solution into the battery case. The electrolytic solution permeates into spaces between the positive electrodes, the negative electrodes, and the separators by capillary force.

In order for the lithium secondary battery to retain long lifespan while having high capacity and high energy density, the electrode assembly in the battery must be fully impregnated with the electrolytic solution. If the electrode assembly is incompletely impregnated with the electrolytic solution, reaction between the electrodes is not smooth, resistance of the battery becomes high, outer characteristics of the battery are deteriorated, and capacity of the battery is abruptly reduced. As a result, battery performance may be deteriorated, the lifespan of the battery may be shortened, and the battery may overheat or explode due to high internal resistance.

In many cases, the positive electrode, the negative electrode, and the separator are all hydrophobic, whereas the electrolytic solution is hydrophilic. For this reason, considerable time is necessary and strict process conditions are required in order to improve impregnability of the electrodes and the separator with the electrolytic solution.

If the thickness of a coating layer formed on a porous substrate is too small, thermal safety of the separator is low. If the thickness of the coating layer is too large, thermal safety of the separator becomes high, but resistance is increased for the lithium secondary battery, and therefore performance of the battery may be deteriorated.

Since most conventional separators for secondary batteries are hydrophobic, a method of coating the separator with a ceramic material in order to improve impregnability of the separator with the electrolytic solution is used. When the coating layer is formed as described above, thermal safety and mechanical characteristics of the separator are improved, but the coating layer acts as resistance in terms of battery characteristics of the secondary battery. As the thickness of the ceramic coating layer is increased, therefore, there is a problem in that battery characteristics of the secondary battery are deteriorated.

Patent Document 1 discloses a coating apparatus that coats a flexible board 1 with a coating solution, wherein the coating apparatus includes a first coating unit 10 configured to coat the flexible board with a first coating solution by dip coating, a second coating unit 20 disposed at a rear end of the first coating unit 10, the second coating unit being configured to coat the flexible board with a second coating solution by gravure coating, and a drying unit 30 and a guide roll 40 disposed at a rear end of the second coating unit, the drying unit being configured to dry the coated flexible board.

Patent document 1 relates to a coating apparatus and a coating method, wherein the second coating unit 20 presses the flexible board and additionally coats the flexible board, whereby the flexible board is coated with the coating solution so as to have a more uniform and larger thickness, but does not recognize influence of the thick coating layer on battery characteristics of a secondary battery.

Therefore, technology related to a coating apparatus and a coating method of a separator for secondary batteries capable of easily performing coating through a simple structure, whereby it is possible to form a uniform and thin coating layer, which is recognized as an important problem in the present invention, has not yet been proposed.

PRIOR ART DOCUMENT (Patent Document 1) Korean Registered Patent Publication No. 10-1653347

DISCLOSURE

Technical Problem

The present invention has been made in view of the above problems, and it is an object of the present invention to provide a coating apparatus and a coating method of a separator capable of stably forming a coating layer having an ultrathin thickness without changing operating conditions of a conventional coating process.

Technical Solution

A coating apparatus for continuously forming a coating layer on substrate film according to the present invention to accomplish the above object includes a water tank located on a movement path of the substrate film, a water tank partition vertically located in the water tank, the water tank partition being configured to partition an inner space of the water tank into two zones, such as a first water tank portion and a second water tank portion, a roller unit configured to continuously transfer the substrate film along the movement path, and a heating unit located outside the water tank, wherein the water tank partition is located spaced apart from an inner bottom surface of the water tank by a first predetermined distance.

A polar solution may be located in each of the first water tank portion and the second water tank portion, a coating solution may be located in the second water tank portion, which may be a non-polar coating solution, the coating solution located in the second water tank portion may be located at an upper surface of the polar solution, horizontal movement of the coating solution located in the second water tank portion to the first water tank may be limited by the water tank partition, and the coating solution may be applied to each surface of the substrate film that passes through the first water tank portion and the second water tank portion in succession.

The roller unit may include an outer roller unit and an inner roller unit, the outer roller unit may include a pair of outer guide rollers disposed spaced apart from each other in parallel, the inner roller unit may include a pair of inner guide rollers disposed spaced apart from each other in parallel, and the pair of inner guide rollers may be located spaced apart from the inner bottom surface of the water tank by a second predetermined distance.

The first predetermined distance between the water tank partition and the inner bottom surface of the water tank may be greater than the second predetermined distance between each of the inner guide rollers and the inner bottom surface of the water tank.

The pair of inner guide rollers may be located spaced apart from opposite vertical sides of the water tank partition by a third predetermined distance.

The pair of outer guide rollers is located outside the water tank so as to correspond to the pair of inner guide rollers.

One inner guide roller of the pair of inner guide rollers may be located in the second water tank portion and one outer guide roller of the pair of outer guide rollers may be located outside an upper end of the second water tank portion so as to correspond to the one inner guide roller such that the substrate film is vertically located between the one inner guide roller and the one outer guide roller.

The heating unit may dry the substrate film having the coating layer formed thereon by coating, and the coating apparatus may include a gas treatment unit configured to treat gas materials volatilized during the drying process.

The present invention provides a coating method using at least one coating apparatus, the coating method including (s1) injecting a polar solution into the water tank such that the polar solution is received in both the first tank portion and the second tank portion, (s2) injecting a coating solution onto an upper surface of the polar solution received in the second water tank portion to provide a coating solution layer, (s3) supplying a substrate film supported by the outer guide rollers and the inner guide rollers to sequentially pass through the first water tank portion and the second water tank portion such that each surface of the substrate film is coated with the coating solution, and (s4) drying the substrate film coated with the coating solution downstream from the second water tank portion.

In step (s2), a thickness of the coating solution layer (110) in the second water tank portion may be adjusted such that a thickness of a coating layer formed on the substrate film (100) by coating is 1 μm or less.

In step (s3), a speed at which the substrate film passes may be adjusted such that a thickness of a coating layer formed on the substrate film by coating is 1 μm or less.

The at least one coating apparatus may include a first coating apparatus and a second coating apparatus, (s1), (s2), (s3), and (s4) may be sequentially performed to complete a first coating step using the first coating apparatus, and steps (s3) and (s4) may be repeated to perform a second coating step using the second coating apparatus, whereby a coating layer may be formed on the substrate film.

The coating solution in step (s3) of the second coating step may be different from the coating solution of the first coating step, whereby a plurality of coating layers may be formed on the substrate film.

In addition, the present invention may provide possible combinations of the above solving means.

Advantageous Effects

As is apparent from the above description, a coating apparatus according to the present invention has an effect in that it is possible to implement an ultrathin coating thickness without changing conventional operating conditions.

A process of forming a coating layer on a substrate film is simple, and it is unnecessary to perform an additional complex process, which is advantageous in terms of production process and manufacturing cost.

The coating layer is formed on the substrate film so as to have an ultrathin thickness, whereby it is possible to improve battery characteristics of a secondary battery.

Also, in the present invention, a small amount of a non-polar solution for coating is disposed on an upper layer of a polar solution configured such that phase separation is possible, whereby it is possible to minimize contaminants.

DESCRIPTION OF DRAWINGS

FIG. 1 is a schematic view of a conventional coating apparatus.

FIG. 2 is a schematic view of a coating apparatus according to a first embodiment of the present invention.

FIG. 3 is a schematic view of a coating apparatus according to a second embodiment the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, a coating apparatus according to the present invention will be described with reference to the accompanying drawings.

FIG. 2 is a schematic view of a coating apparatus according to a first embodiment of the present invention.

Referring to FIG. 2, the coating apparatus according to the first embodiment of the present invention includes a coating unit 200, a guide roller unit 300, and a heating unit 400.

First, when describing the coating unit 200 in detail, the coating unit 200 includes a water tank 210 having defined therein a receiving space configured to receive a solution and a water tank partition 220 located in the receiving space so as to divide the receiving space.

The water tank partition 220, which is formed in a plate shape, may be located in the water tank 210 so as to partition the receiving space of the water tank 210 into two parts, such as a first water tank portion 211 and a second water tank portion 212. Here, the first water tank portion 211 is a region adjacent to an unwinder (not shown) from which a substrate film 100 is supplied, and the second water tank portion 212 is a region adjacent to a rewinder (not shown) around which the substrate 100 coated with a coating layer is wound.

A lower-end side of the water tank partition 220 and an inner bottom surface (not shown) of the water tank 210 may be spaced apart from each other by a predetermined distance. In the present invention, the distance between the lower-end side of the water tank partition 220 and the inner bottom surface of the water tank 210 may range from 0.1 m to 1.0 m, specifically from 0.1 m to 0.5 m, more specifically from 0.1 m to 0.2 m. This is advantageous to minimizing the scale of the coating apparatus while the substrate film 100, a description of which will follow, stably passes between the lower-end side of the water tank partition 220 and the inner bottom surface of the water tank 210.

Next, the guide roller unit 300 will be described. In the present invention, at least one guide roller configured to guide a movement path of the substrate film 100, a description of which will follow, may be included. Specifically, an outer guide roller located outside the water tank 210 and an inner guide roller located in the receiving space of the water tank 210 may be included. The outer guide roller may include a first outer guide roller 310 and a second outer guide roller 320. The first outer guide roller 310 is located between the unwinder (not shown) from which the substrate film 100 is supplied and the water tank 210, and transfers the substrate film 100 supplied from the unwinder to inner guide rollers 330 and 340, a description of which will follow, located in the receiving space of the water tank 210. The second outer guide roller 320 is located so as to face the first outer guide roller 310 in the state in which the water tank 210 is disposed therebetween, and supplies the substrate film 100 that has passed through the inner guide rollers 330 and 340 in the water tank 210 to the rewinder (not shown), which is located at a rear end of the water tank.

The inner guide rollers may be located in the receiving space of the water tank 210. The inner guide rollers include a pair of inner guide rollers disposed in parallel to each other while being horizontally spaced apart from each other by a predetermined distance, i.e. a first inner guide roller 330 and a second inner guide roller 340. The first inner guide roller 330 and the second inner guide roller 340 may be located so as to be spaced apart from the inner bottom surface of the water tank 210 by a predetermined distance and to be spaced apart from opposite side surfaces of the water tank partition 220 by a predetermined distance. The substrate film 100 supplied through rotation of the first outer guide roller 310 is transferred to the second inner guide roller 340 via a lower-end surface of the first inner guide roller 330, and is transferred to the outside of the water tank 210 via a lower-end surface of the second inner guide roller 340. The substrate film 100 located between the first outer guide roller 310 and the first inner guide roller 330 and the substrate film 100 located between the second outer guide roller 320 and the second inner guide roller 340 may be located vertically or at a predetermined angle. Specifically, the substrate film 100 located between the second outer guide roller 320 and the second inner guide roller 340 may be located vertically, which is advantageous to a coating solution, a description of which will follow, being coated on opposite surfaces of the substrate film 100 at the same thickness.

In addition, although the substrate film 100 located between the second outer guide roller 320 and the second inner guide roller 340 is shown as being located vertically in the figure of the present invention, the second outer guide roller 320 and the second inner guide roller 340 may be spaced apart from each other by a predetermined distance, and the substrate film 100 located therebetween may be located at a predetermined angle to the ground. In this case, uniform coating layers having different thicknesses may be formed on opposite surfaces of the substrate film 100

Next, the heating unit 400 will be described in detail.

The substrate film 100 that has passed through the second inner guide roller 340 located in the water tank 210, i.e. the substrate film having the coating layers formed thereon, may be dried while passing through the heating unit 400. In the heating unit 400, the substrate film 100 having the coating layers 101 formed thereon by coating may be dried at a temperature of 40° C. to 100° C.

Here, the heating unit 400 may be located between the second inner guide roller 340 and the second outer guide roller 320. The heating unit 400, which is configured to dry the coating layers formed on the substrate film 100 by coating, injects high-temperature hot air to the coating layers formed on opposite surfaces of the substrate film 100 by coating in order to dry the coating layers. In addition, although not shown in the figure, a gas refinement unit configured to prevent secondary contamination due to gas components generated in the hot-air drying process may be provided.

The heating unit 400 may be a UV hardener, and the kind of the heating unit is not particularly restricted as long as it is possible to stably and efficiently dry the substrate film 100 having the coating layers formed thereon by coating.

Next, the substrate film 100 will be described in detail.

Here, the substrate film 100 may be a separator substrate. The separator substrate, which electrically isolates a positive electrode and a negative electrode of a secondary battery from each other, thereby preventing short circuit, and provides a lithium ion movement path, may be used without specific limitations as long as the separator substrate can be normally used for a separator of a secondary battery. The substrate film may be a polyolefin-based separator usually used in the art to which the present invention pertains, and may be, for example, a substrate film made of any one or a mixture of two or more selected from the group consisting of high-density polyethylene, low-density polyethylene, linear low-density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene, and a mixture thereof; however, the present invention is not particularly limited thereto. In addition, a thin film or non-woven fabric may be used alone or in combination as the substrate film 100.

In the present invention, the thickness of the separator substrate may range from 5 to 50 μm. In the present invention, the thickness of the substrate film is not particularly restricted to the above range. If the thickness of the substrate film is much less than the lower limit, however, the mechanical properties of the substrate film are deteriorated, whereby the separator may be easily damaged during use of the battery. Meanwhile, the pore size of the substrate film may range from 0.01 μm to 50 μm, and porosity of the substrate film may range from 10% to 95%, although the pore size and porosity of the substrate film are not particularly restricted.

Here, the substrate film 100 may be an electrode current collector. The electrode current collector may be a positive electrode current collector or a negative electrode current collector of the secondary battery.

The positive electrode current collector is generally manufactured so as to have a thickness of 3 μm to 500 μm. The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion to the positive electrode active material. The positive electrode current collector may be configured in any of various forms, such as a film, a sheet, a foil, a net, a porous body, a foam body, and a non-woven fabric body.

The negative electrode current collector is generally manufactured so as to have a thickness of 3 μm to 500 μm. The negative electrode current collector is not particularly restricted as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase binding force of the negative electrode active material, in the same manner as the positive electrode current collector. The negative electrode current collector may be configured in any of various forms, such as a film, a sheet, a foil, a net, a porous body, a foam body, and a non-woven fabric body.

Next, a polar solution 120 and a coating solution 110 received in the water tank 210 will be described.

The polar solution 120 may be water. The polar solution 120 is received in the water tank 210, i.e. the first water tank portion 211 and the second water tank portion 212, and the first inner guide roller 330 and the second inner guide roller 340 are located in the solution 120. In addition, a part of the water tank partition 220, which is vertically disposed, is located in the polar solution 120.

The coating solution 110, which is a non-polar solution, may be received in the second water portion 212, which is partitioned by the water tank partition 220. Specifically, the coating solution 110 is received in the second water tank portion 212, and the coating solution 110 is not received in the first water tank portion 211. In addition, movement of the coating solution 110 received in the second water tank portion 212 is blocked by the water tank partition 220, and therefore the coating solution does not move to the first water tank portion 211.

The coating solution 110 forms a non-polar solution layer that floats on the polar solution 120 in a state of being separated from the polar solution 120. The substrate film 100 passes through the coating solution layer 110 formed on the polar solution 120 received in the second water tank portion 212 via the first outer guide roller 310, the first inner guide roller 330 and the second inner guide roller 340, whereby the coating solution 110 is applied to surfaces of the substrate film 100, and therefore coating layers 101 are formed on the surfaces of the substrate film. The thickness of each of the coating layers 101 may be adjusted by the height of the coating solution 110 received in the second water tank portion 212 and/or the transfer speed of the substrate film 100. In the present invention, the thickness of each of the coating layers 101 may be 4 μm or less, specifically 1 μm or less.

Here, the coating solution 110, which is a non-polar solution, may include a non-polar solvent, such as methyl ethyl ketone (MEK), toluene, or pentane.

Although binder, such as not required, a acrylate or PVdF, and a fluorine-based non-ionic surfactant may be included as additives so as to form the coating solution 110 together with the non-polar solvent.

In the present invention, the binder may constitute the coating layer of the separator together with an inorganic material, wherein the binder may maintain binding between inorganic particles and may improve the force of adhesion between an electrode and the separator.

In addition, the kind of the binder is not particularly restricted as long as the binder does not chemically change the coating layer of the separator. For example, the binder may be made of polyolefin, such as polyethylene or polypropylene; a fluorine-containing resin, such as polyvinylidene fluoride or polytetrafluoroethylene; fluorine-containing rubber, such as a vinylidene fluoride-hexafluoropropylene-tetrafluoroethylene copolymer or an ethylene-tetrafluoroethylene copolymer; a styrene-butadiene copolymer and a hydride thereof; a (meth)acrylic acid ester copolymer, such as a methacrylic acid ester copolymer, an acrylonitrile acrylic acid ester copolymer, or a styrene acrylic acid ester copolymer; rubber, such as ethylene propylene rubber; polyvinyl acetate; a resin having a melting point or a glass transition temperature of 180° C. or higher, such as polyphenylene ether, polysulfone, polyethersulfone, polyphenylene sulfide, polyetherimide, polyamide, polyimide, polyamide imide, polyetheramide, polyester, aromatic polyester, or polyetheretherketone; polycarbonate; polyacetal; a water soluble resin, such as carboxyalkyl cellulose, alkyl cellulose, hydroxyalkyl cellulose, starch, polyvinyl alcohol, sodium alginate, polyethylene glycol, cellulose ester, polyacrylic acid, polyacrylic amide, or polymethacrylic acid; or a copolymer including two or more thereof.

The binder may include a PVdF-based binder configured such that phase separation is possible, and the content of the PVdF-based binder may be 80 weight % or more based on the total weight of the binder. If the content of the PVdF-based binder is less than 80 weight %, it is difficult to increase porosity of the inorganic coating layer to a desired level, which is undesirable.

Specifically, the PVdF-based binder may be at least one selected from the group consisting of PVdF and PVdF copolymers. More specifically, each of the PVdF copolymers may be configured such that the content of a PVdF monomer is 92 moles or more based on total moles of monomers constituting the copolymer. If the content of the PVdF monomer is less than 92 mole %, phase separation is reduced, whereby it is difficult to increase porosity of the inorganic coating layer to a desired level.

In the present invention, the inorganic particles are not particularly restricted as long as the inorganic particles are electrochemically stable. The inorganic particles are not particularly restricted as long as oxidation and/or reduction do not occur within an operating voltage range of an electrochemical device to which the inorganic particles are applied. In particular, when inorganic particles having ion transfer ability are used, ionic conductivity in the electrochemical device is increased, which is advantageous to performance improvement. In the present invention, the inorganic material may be at least one selected from the group consisting of $BaTio_3$, $Pb(Zr,Ti)O_3$ (PZT), $Pb_{1-x}La_xZr_{1-y}Ti_yO_3$ (PLZT) ($0<x<1$, $0<y<1$), $PB(Mg_3Nb_{2/3})O_3$—$PbTiO_3$ (PMN-PT), hafnia ($HfO_2$), $SrTiO_3$, $SnO_2$, $CeO_2$, MgO, NiO, Cao, ZnO, $ZrO_2$, $Y_2O_3$, $Al_2O_3$, $TiO_2$, SiC, $(LiAlTiP)_xO_y$-based glass ($0<x<4$, $0<y<13$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), and a mixture thereof. However, the present invention is not limited thereto.

The coating solution 110 according to the present invention may include an additive, wherein the additive may be a fluorine-based non-ionic surfactant.

The fluorine-based non-ionic surfactant may be, for example, a fluoroalkyl ethylene oxide appendage, a fluoroalkenyl ethylene oxide appendage, a fluoroalkyl propylene oxide appendage, a fluoroalkenyl propylene oxide appendage, a perfluoroalkyl ethylene oxide appendage, or a perfluoroalkenyl ethylene oxide appendage.

In the present invention, when the substrate film 100 is an electrode current collector, the coating solution 110 may include a primer material.

The primer serves to increase the force of adhesion of the positive electrode active material to a metal substrate while maximally inhibiting an increase in internal resistance. Specifically, conductive material and a polymer material may be included in a weight ratio of 1:10 to 10:1. If the content of the conductive material is too small, operating characteristics of the battery are deteriorated due to an increase in internal resistance. If the content of the polymer material is too small, it is not possible to provide a desired level of adhesive force. Consequently, the content of the conductive material and the content of the polymer material may be appropriately selected within the above range.

The conductive material may be, for example, at least one selected from the group consisting of graphite, carbon black, acetylene black, Ketjen black, channel black, furnace black, lamp black, thermal black, carbon fiber, and carbon fluoride; however, the present invention is not limited thereto. Thereamong, carbon black is particularly preferable. It is preferable for the conductive material to have a particle size of 10 to 100 nm.

The polymer material may be, for example, at least one selected from the group consisting of a polyimide-based copolymer, an acrylate-based copolymer, polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber and fluoro rubber; however, the present invention is not limited thereto. Thereamong, the polyimide-based copolymer is particularly preferable.

In the coating apparatus according to the first embodiment of the present invention, as described above, the polar solution 120 and the non-polar coating solution 110 are received in the water tank 210 partitioned by the water tank partition 220, the coating solution 110 is applied to the surfaces of the substrate film 100, and the substrate film 100 having the coating layers formed thereon by coating is dried by the heating unit 400, whereby the coating layers 101 are formed on the surfaces of the substrate film 100.

FIG. 3 is a schematic view of a coating apparatus according to a second embodiment of the present invention.

The second embodiment of the present invention is identical to the first embodiment of the present invention described with reference to FIG. 2 except that the coating apparatuses according to the first embodiment are disposed in succession in order to form a plurality of coating layers using coating solutions. Hereinafter, therefore, only technical construction for forming the plurality of coating layers will be described.

Referring to FIG. 3, the coating apparatus according to the second embodiment of the present invention may be configured to have a structure in which the coating apparatuses according to the first embodiment are disposed in succession.

A substrate film 1100 supplied to a first outer guide roller 1310 passes through the interior of a water tank 1210, a first coating solution 1110 is applied to each surface of the substrate film 1100, and drying is performed by a heating unit 1400, whereby a substrate film 1100 having a first coating layer 1101 formed thereon by coating is formed, and the substrate film is supplied to a first outer guide roller 2310 located at a second water tank 2210 disposed at a rear end of the first water tank. The substrate film 1100 having the first coating layer 1101 formed thereon by coating, supplied to the first outer guide roller 2310, passes through the interior of the second water tank 2210, and a second coating solution 2110 is applied to a surface of the first coating layer 1101. Subsequently, drying is performed by a heating unit 2400, whereby a substrate film 1100 having the first coating layer 1101 and a second coating layer 2101 formed thereon by coating is finally formed.

Here, the first coating solution 1110 and the second coating solution 2110 may include the same non-polar material or may include different non-polar materials.

Those skilled in the art to which the present invention pertains will appreciate that various applications and modifications are possible within the category of the present invention based on the above description.

DESCRIPTION OF REFERENCE NUMERALS

1: Flexible board
10: First coating unit
20: Second coating unit
30: Drying unit
40: Guide roll

100, 1100: Substrate films
101: Coating layer
1101: First coating layer
2101: Second coating layer
110: Coating solution
1110: First coating solution
2110: Second coating solution
120, 1120, 2120: Polar solutions
200, 1200, 2200: Coating units
210, 1210, 2210: Water tanks
211, 1211, 2211: First water tank portions
212, 1212, 2212: Second water tank portions
220, 1220, 2220: Water tank partitions
300, 1300, 2300: Roller units
310, 1310, 2310: First outer guide rollers
320, 1320, 2320: Second outer guide rollers
330, 1330, 2330: First inner guide rollers
340, 1340, 2340: Second inner guide rollers
400: Heating unit

The invention claimed is:

1. A coating apparatus for continuously forming a coating layer on a substrate film, the coating apparatus comprising:

a single water tank located on a movement path of the substrate film, the water tank having a first end wall and a second end wall;

a water tank partition vertically located in the water tank, the water tank partition being configured to partition an inner space of the water tank into a first water tank portion extending between the first end wall and the water tank partition and a second water tank portion extending between the water tank partition and the second end wall, the second water tank portion being located downstream from the first water tank portion;

a roller unit configured to continuously transfer the substrate film along the movement path; and a heating unit located outside the water tank, wherein the water tank partition is spaced apart from an inner bottom surface of the water tank by a first predetermined distance, wherein a polar solution is located in each of the first water tank portion and the second water tank portion, wherein a coating solution is located in the second water tank portion at an upper surface of the polar solution, the coating solution being non-polar, the coating solution extending from the water tank partition to the second end wall at a same liquid level, and wherein the polar solution consists of water.

2. The coating apparatus according to claim 1, wherein horizontal movement of the coating solution located in the second water tank portion to the first water tank portion is limited by the water tank partition, and wherein the coating solution is applied to each surface of the substrate film that passes through the first water tank portion and the second water tank portion in succession.

3. The coating apparatus according to claim 2, wherein the roller unit comprises an outer roller unit and an inner roller unit, wherein the outer roller unit comprises a pair of outer guide rollers disposed spaced apart from each other in parallel, wherein the inner roller unit comprises a pair of inner guide rollers disposed spaced apart from each other in parallel, and wherein the pair of inner guide rollers is located spaced apart from the inner bottom surface of the water tank by a second predetermined distance.

4. The coating apparatus according to claim 3, wherein the first predetermined distance between the water tank partition and the inner bottom surface of the water tank is greater than the second predetermined distance between each of the inner guide rollers and the inner bottom surface of the water tank.

5. The coating apparatus according to claim 3, wherein the pair of inner guide rollers is located spaced apart from opposite vertical sides of the water tank partition by a third predetermined distance.

6. The coating apparatus according to claim 3, wherein the pair of outer guide rollers is located outside the water tank so as to correspond to the pair of inner guide rollers.

7. The coating apparatus according to claim 6, wherein one inner guide roller of the pair of inner guide rollers is located in the second water tank portion and one outer guide roller of the pair of outer guide rollers is located outside an upper end of the second water tank portion so as to correspond to the one inner guide roller such that the substrate film is vertically located between the one inner guide roller and the one outer guide roller.

8. The coating apparatus according to claim 1, wherein the heating unit is configured to dry the substrate film having the coating layer formed thereon by coating, and wherein the coating apparatus comprises a gas treatment unit configured to treat gas materials volatilized during drying of the substrate by the heating unit.

9. The coating apparatus according to claim 1, wherein the coating apparatus comprises a gas treatment unit configured to treat gas materials volatilized during drying of the substrate by the heating unit, and wherein the heating unit comprises a gas refinement unit configured to prevent secondary contamination caused by gas components generated during the hot-air drying process.

10. The coating apparatus of claim 9, wherein a distance between a lower-end side of the water tank partition and an inner bottom surface of the water tank is from 0.1 m to 0.2 m.

11. A coating apparatus for continuously forming a coating layer on a substrate film, the coating apparatus comprising:

a first water tank located on a movement path of the substrate film, the first water tank having a first end wall and a second end wall;

a first water tank partition vertically located in the first water tank, the first water tank partition being configured to partition an inner space of the first water tank into a first water tank portion extending between the first end wall and the first water tank partition and a second first water tank portion extending between the first water tank partition and the second end wall;

a second water tank located on the movement path of the substrate film, the second water tank having a first end wall and a second end wall;

a second water tank partition vertically located in the second water tank, the second water tank partition being configured to partition an inner space of the second water tank into a third water tank portion extending between the first end wall of the second water tank and the second water tank partition and a fourth water tank portion extending between the second water tank partition and the second end wall of the second water tank;

a roller unit configured to continuously transfer the substrate film along the movement path; and a heating unit located outside at least one of the first water tank and the second water tank, wherein the first water tank partition and the second water tank partition are spaced apart from inner bottom surfaces of the first water tank and the second water tank, respectively, by a first predetermined distance, wherein a polar solution is located in each of the first water tank portion, the second water tank, the third water tank portion, and the fourth water tank portion, wherein a first coating solution is located in the second water tank portion at an upper surface of the polar solution, the first coating solution being non-polar, the first coating solution extending from the first water tank partition to the second end wall of the first water tank at a same liquid level, wherein a second coating solution is located in the fourth water tank portion at an upper surface of the polar solution, the fourth coating solution being non-polar, the fourth coating solution extending from the second water tank partition to the second end wall of the second water tank at a same liquid level, wherein the second water tank is located downstream from the first water tank such that the substrate is inserted into the polar solution of the second water tank after being coated with the first coating solution from the first water tank, and wherein at least the polar solution in the first water tank portion and the second water tank portion consists of water.

* * * * *